United States Patent
Comperda (10) Patent No.: US 10,080,953 B1
(45) Date of Patent: Sep. 25, 2018

(54) METHOD AND DEVICE FOR PLAYING A SPORTS-RELATED CARD FILL GAME

(71) Applicant: Scott M. Comperda, Geneva, IL (US)

(72) Inventor: Scott M. Comperda, Geneva, IL (US)

( * ) Notice: Subject to any disclaimer, the term of this patent is extended or adjusted under 35 U.S.C. 154(b) by 0 days.

(21) Appl. No.: 15/436,447

(22) Filed: Feb. 17, 2017

(51) Int. Cl.
*G06F 17/00* (2006.01)
*A63F 1/00* (2006.01)
*A63B 71/06* (2006.01)
*A63F 13/816* (2014.01)
*A63B 102/18* (2015.01)

(52) U.S. Cl.
CPC ............ *A63F 1/00* (2013.01); *A63B 71/0669* (2013.01); *A63F 13/816* (2014.09); *A63B 2102/18* (2015.10); *A63F 2001/008* (2013.01)

(58) Field of Classification Search
None
See application file for complete search history.

(56) References Cited

U.S. PATENT DOCUMENTS

| | | |
|---|---|---|
| 4,174,857 A | 11/1979 | Koza |
| 4,429,877 A | 2/1984 | Coppock |
| 4,508,513 A | 4/1985 | Donovan |
| 5,683,090 A | 11/1997 | Zeile et al. |
| 6,015,345 A | 1/2000 | Kail |
| 6,102,797 A | 8/2000 | Kail |
| 6,308,989 B1 | 10/2001 | La Porta |
| 7,354,040 B2 | 4/2008 | Schneider |
| 8,727,349 B2 | 5/2014 | Hodges et al. |
| 8,820,744 B1 | 9/2014 | Lawton |
| 2004/0087358 A1 | 5/2004 | Byrne |
| 2005/0093228 A1 | 5/2005 | Brian, III |
| 2007/0243925 A1* | 10/2007 | LeMay .................. G07F 17/32 463/20 |
| 2007/0288316 A1 | 12/2007 | Burns et al. |
| 2011/0095483 A1 | 4/2011 | Stein |
| 2011/0225169 A1* | 9/2011 | Kurian .................. G06Q 10/06 707/748 |
| 2017/0252656 A1* | 9/2017 | Uy, Jr. .................. A63F 13/828 |

* cited by examiner

*Primary Examiner* — Ronald Laneau
(74) *Attorney, Agent, or Firm* — Crawford Intellectual Property Law LLC; Brie A. Crawford; Marc J. Whipple (57) ABSTRACT

A method for playing a sports-related card fill game which fills in required locations on a game card based upon events in otherwise unrelated sporting events is disclosed. Further disclosed are devices which implement this method and may automatically perform the information gathering and card-fill steps. Alternate embodiments of the method and the implementing devices with additional features enhancing the functionality and reliability of the method and devices are also disclosed.

14 Claims, 4 Drawing Sheets

METHOD AND DEVICE FOR PLAYING A SPORTS-RELATED CARD FILL GAME

This invention relates to a method for playing a sports-related card fill game which uses events occurring in otherwise unrelated sporting events to conduct play and determine the outcome of the sports-related card fill game. The invention extends to devices which implement the method both electronically and non-electronically.

BACKGROUND OF THE INVENTION

The present invention relates to games which derive their scoring from events occurring in external sporting events. While wagering on both the overall outcome of sporting events and on individual plays or other occurrences in sporting events are known to persons of ordinary skill in the art, there is always demand for new and innovative ways to allow persons not participating in sporting events to feel as though they had a personal stake in the outcome of the sporting event or the performance of the players.

It will be useful to provide a new form of game through which players can participate in a game which has an outcome based on individual plays or other occurrences, such as scoring in particular innings or scoring periods. It will also be useful to provide such a game in a format which can easily be used for promotional purposes by those putting on the sporting events, advertisers, or third parties assisting either group with the promotion of sporting events or associated goods and services. The present invention addresses these concerns.

SUMMARY OF THE INVENTION

The objectives of the invention (which become clear by consideration of the specification and drawings as a whole) are met by providing a method for playing a "card-fill" game in which the scoring of the card-fill game is directly related to the scoring in each inning or scoring period of a sporting event.

Hereafter in this application, the intended ultimate user of the invention and/or its embodying device(s) shall be identified as a "Player." Each person or entity who offers games to play and/or provides games to play on behalf of others shall be identified as a "Sponsor," and a person or entity who wishes to have games offered to play on its behalf for promotional purposes is an "Advertiser." A person or entity providing permission for sports information to be used in the method or embodying device is a "Licensor." A person or entity may at any time be any one or any combination of Sponsor, Advertiser, or Licensor.

Among the many objectives of the present invention is the provision of a method which allows Players to play a card-fill game provided by a Sponsor such that they may easily determine the progress and outcome of the card-fill game based upon the scoring of an external sporting event.

Another objective of the present invention is the provision of a device which implements the method and allows Players to easily and efficiently determine the progress and outcome of the card-fill game based upon the scoring of an external sporting event.

These and other objectives of the invention (which other objectives become clear by consideration of the specification and drawings as a whole) are met by providing the method and embodying devices described herein.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

The present invention is a two-player game. The players shall be identified as Player A or "You," with the Innings (see below) assigned to Player A identified as "Your Innings," and Player B or "Opponent," with the Innings assigned to Player B identified as "Opponent's Innings."

The present invention is a card-fill game which uses the scoring results of an unrelated external sporting event which is broken into at least two separate time or activity periods to determine the outcome of the card-fill game. The preferred embodiment(s) describe the invention as a card-fill game utilizing the scoring results of a game of baseball. A baseball game has nine innings each of which has a visiting team batting period (usually, if not always, the "top" of the Inning, played first) and a home team batting period (usually, if not always, the "bottom" of the Inning, played second.) It will be assumed that the visiting team bats at the top of the Inning and the home team bats at the bottom of the Inning. Thus each time or activity period in the description of the preferred embodiment(s) will be referred to as an "Inning," and if it has separate scoring periods for each team (like baseball) the separate scoring periods will be referred to as half-Innings.

The invention is not limited to the use of baseball scoring results, and an "Inning" can also be defined as a single period in a hockey or basketball game, a single quarter in a football game, or any other analogous sporting event period. As will be described herein, the invention uses the scoring in each Inning to determine the outcome of the card-fill game. While the scoring of a "team" is referred to throughout the application, it should be noted that a team may have any number of players, including a single player.

It is required that the fundamental outcome of the card-fill game be unrelated to the overall outcome of the baseball game or other external sporting event. If the Innings used for scoring the card-fill game are determined randomly, it is not relevant whether the score in Innings assigned to a player will produce a win for the team from which a particular player's score per Inning is derived.

It is required that the scoring of the card-fill game be related to individual events like Innings. It is neither preferred nor required, but it is acceptable, that there be a bonus or extra scoring item related to the outcome of the external sporting event, either specific to the external sporting event (a bonus or extra scoring item is given to one of the players if a particular team wins) or related to both the external sporting event and the card-fill game (a bonus or extra scoring item is given to one of the players if the team with most Inning matches also wins the external scoring event.) It is neither preferred nor required, but it is acceptable, for a bonus or extra scoring item to be given to one of the players if they have more than a certain number of Inning score matches, including but not limited to requiring that all of their Inning scores match.

For baseball, the Innings applied in the card-fill game are from the first eight innings ($1^{st}$, $2^{nd}$, $3^{rd}$, $4^{th}$, $5^{th}$, $6^{th}$, $7^{th}$, and $8^{th}$) played in a baseball game. There are a total of 18 half-Innings in a 9-Inning game of baseball. However, in the preferred embodiment, the $9^{th}$ Inning is excluded because the bottom half of the $9^{th}$ Inning (the "bottom of the $9^{th}$") is not always played by the home team. (If the home team is ahead after the top of the $9^{th}$, it is not necessary to play the bottom of the $9^{th}$, since only the batting team can score in baseball. This is not true in other sports such as football or basketball, and so the last Inning of any sport in which this is not true may be used as a score-determining Inning for the card-fill game.) Since the bottom of the $9^{th}$ cannot be guaranteed to be played, in the interests of fairness and symmetry neither player is assigned a scoring event related to the scoring, if any, in the $9^{th}$ Inning. Therefore, 16 half-Innings (eight top half-Innings, played by the visiting team; and eight bottom half-Innings, played by the home team) is the optimum number of available half-Innings in the pool/lot to be distributed to the two players, Player A and Player B.

It is required to have a rule for the card-fill game which specifies what happens if the entire first eight Innings of the relevant baseball game are not played, as may happen under the rules of baseball. (For example, in the event of a rain-out after five full innings of play.) In the preferred embodiment the rule for the card-fill game will be that the assigned score for any half-Inning not played is zero.

To begin the game, Player A and Player B are each assigned an equal number of half-Innings, ranging from one to eight half-Innings each. The score obtained by the batting team in the baseball game in each half-Inning, as will be described, will determine the score of the player assigned that half-Inning. It is preferred, but not required, that the half-Innings be assigned randomly if fewer than eight half-Innings are assigned to each player. It is required that the half-Innings that the two players are assigned are exclusive, such that the score obtained by the batting team in any particular half-Inning of the baseball game will only directly impact the score of one player.

The score accrued from a given half-Inning assigned to a player is equal to the number of runs scored in the corresponding half-Inning by the team at bat in the actual baseball game. Thus if Player A is assigned the top of the fifth inning, and the visiting team bats and scores three runs in the top of fifth inning, Player A scores three points. The object of the game is to score more total points (runs) in all of your Innings than your Opponent scores in all of their Innings. The player obtaining the most points scored by runs scored in the actual baseball game from all of their assigned half-Innings is the winner.

Baseball is usually a low-scoring game with many Innings in which only one or no runs are scored. This means that ties or draws (even score, no winner can be determined by points) will be fairly common in the preferred embodiment under the rules thus far set forth. To minimize the number of draws it is required that there be at least one method of breaking ties if the players have the same number of points after the assigned half-Innings have all been played. It is preferred that the following two methods of tie-breaking be used. First, if one player has a single half-Inning score that is higher than any single half-Inning score of the other player, that player is declared the winner. Second, the player with the first assigned half-Inning in which a run was scored by the batting team in the baseball game is deemed the winner. It is preferred, but not required, that if both players obtain zero runs from their half-Innings, and thus no tie-breaking determination is possible, then the card-fill game is a draw and there is no winner. If the game is being played for a prize, if one player beats the other, the prize is not awarded in the event of a draw. It is neither preferred nor required, but is acceptable, for the additional tie-breaking determination to be that one of the teams in the baseball game is assigned to one player, and if that team wins, that player wins, and vice versa.

It is slightly preferred, but not required, that one player be assigned half-Innings which are all the top of an actual Inning, and that the other player be assigned half-Innings which are all the bottom of an actual Inning. If it is desired to make the outcome of the card-fill game even less directly correlated to the outcome of the baseball game, the players may receive random half-Inning assignments from either the top or bottom of any given Inning, so long as no half-Inning is assigned to more than one player. If the external sporting event is not one in which teams take turns at scoring opportunity, it is required that entire Innings be assigned as a unit to an individual player, and no Inning is assigned to more than one player.

Figure 1:
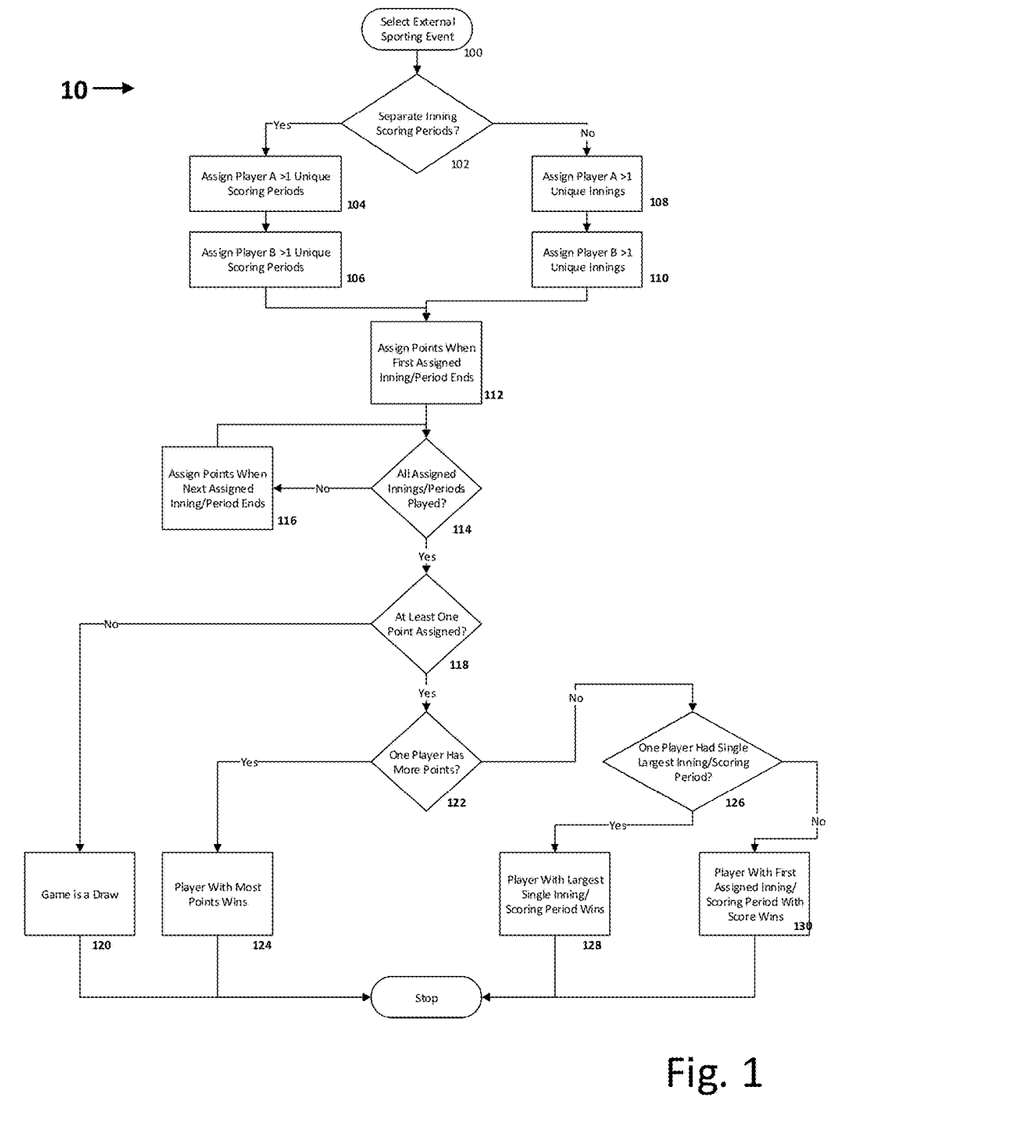
FIG. 1 depicts a process flow diagram showing the method of the invention.

FIG. 1 shows the basic method of practicing the invention. The method is identified as Process 10, which comprises the following individual steps. As will be obvious to persons of ordinary skill in the art, the steps, or steps equivalent thereto, may be practiced in any reasonable order which will produce the desired result. Especially, the Innings may be assigned prior to sporting event selection so long as they are selected in accord with the type of sporting event eventually selected.

Figure 2:
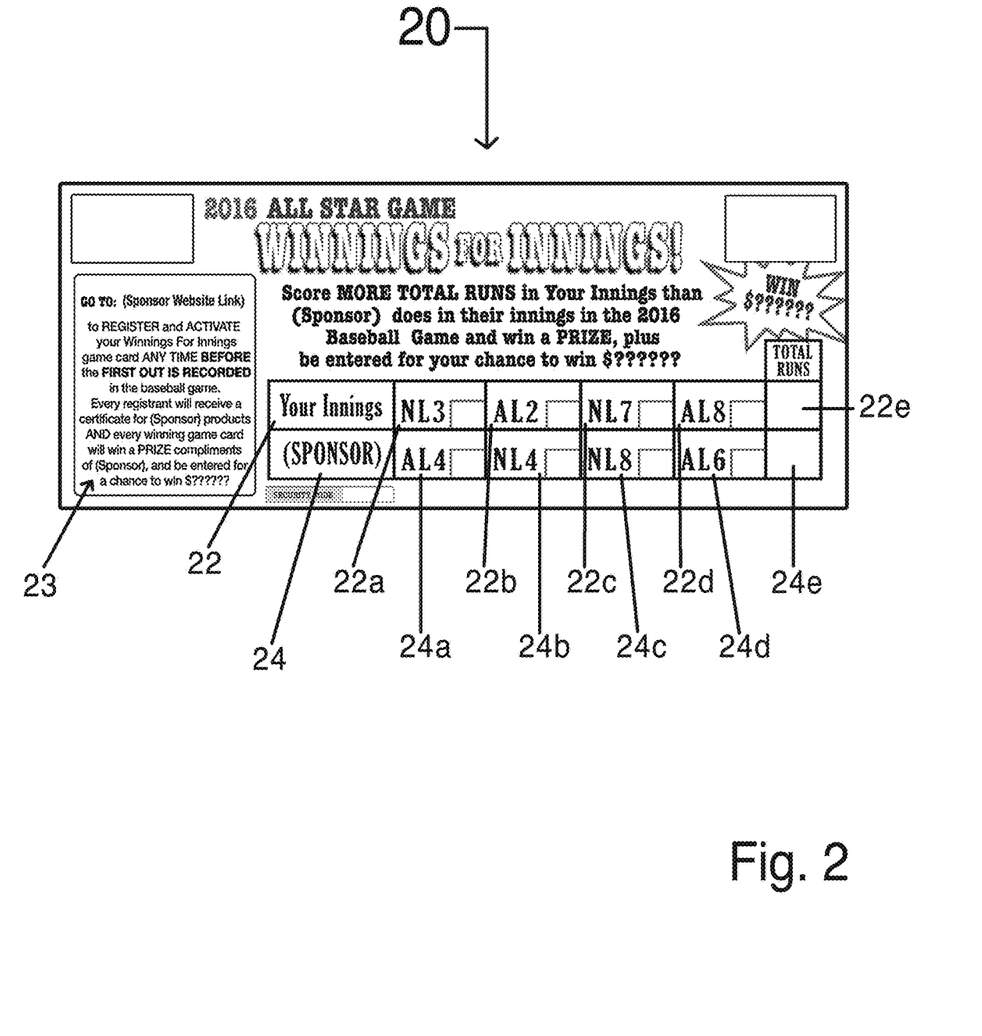
FIG. 2 depicts an overhead view of a game card comprising an embodiment of the invention.

As will be obvious from FIG. 2, it is required that the sporting event is predetermined at the time the card for the card-fill game is created. The Players have no control over the selection of the sporting event.

In Sporting Event Selection Step 100, a particular sporting event, such as a particular baseball game to be played on a particular day between two particular teams, is selected to be the basis of the scoring of the card-fill game. It is required that the sporting event selected have at least four Innings, which may comprise either separate scoring periods for each team or a single scoring period for both teams.

In Scoring Period Evaluation Step 102, it is determined whether Innings have separate scoring periods or a single scoring period (for example a half-Inning in baseball) for each team. If there are separate scoring periods, steps 104 and 106 occur. If not, steps 108 and 110 occur. In either case the process then continues with step 112.

In Scoring Period A Assignment Step 104, Player A is assigned at least two unique Scoring Periods in the sporting event from which their score in the card-fill game will be determined. In Scoring Period B Assignment Step 106, Player B is assigned at least two unique Scoring Periods in the sporting event from which their score in the card-fill game will be determined.

As will be obvious from FIG. 2, it is required that the assignment of the Scoring Periods and the Innings is predetermined at the time the card for the card-fill game is created. The Players have no control over the assignment of the Scoring Periods or the Innings.

In Inning Assignment Step 108, Player A is assigned at least two unique Innings in the sporting event from which their score in the card-fill game will be determined. In Inning Assignment Step 110, Player B is assigned at least two unique Innings in the sporting event from which their score in the card-fill game will be determined.

In Initial Point Assignment Step 112, after the sporting event begins and the first Inning or Scoring Period which has been assigned to a player has ended, the player is assigned one point for each run (or other predefined point-generating event) scored in that Inning or Scoring Period.

In Game Termination Detection Step 114, an evaluation is made as to whether all assigned Innings or Scoring Periods have ended. (The answer to this will always be "no" after the first assigned Inning or Scoring Period ends, but for brevity Game Termination Detection Step 114 is first performed immediately after 112.) If so, the process continues to Point Determination Step 118. If not, the process continues to Ongoing Points Assignment Step 116, in which points are assigned for the next assigned Inning or Scoring Period which ends, and then loops back to Game Termination Detection Step 114.

In Point Determination Step 118, it is determined whether at least one point has been assigned to one player. If not, the process proceeds to Draw Declaration Step 120, the game is a draw, and the process ends. It is optional to include some additional method of determining a winner, such as evaluating assigned Innings or Scoring Periods for a hit, or strikeouts, or an overall victor in the sporting event, or any other reasonable event, but it is neither preferred nor required. If at least one point has been assigned to one player, then the process continues to Point Comparison Step 122.

In Overall Point Comparison Step 122, it is determined whether one player has more points than the other. If so, the method proceeds to First Winner Declaration Step 124, the player with the most points wins, and the process ends. If not, the method proceeds to Individual Point Comparison Step 126.

In Individual Point Comparison Step 126, it is determined whether either player had an assigned Inning or Scoring Period in which they received more points than the other player did in any of their assigned Innings or Scoring Periods. If so, the method proceeds to Second Winner Declaration Step 128, and the process ends. If not, the method proceeds to Third Winner Declaration Step 130, the player who first received a point (in other words, the player to whom the first Inning or Scoring Period in which at least one point-generating event occurred was assigned) is declared the winner, and the process ends.

Many other alternate winning determination methods may be used. For example, if each player is assigned a specific team for all Innings of the Event, that team may be considered the "player's team." Alternate winning determination methods can include comparisons regarding the player's teams, such as which player's team scored first during the Event, or any other reasonable comparison. E.G. in baseball, which player's team had the most hits or strikeouts, or the fewest errors or walks.

Several alternate physical embodiments of the method will now be described, as descriptions of FIGS. 2, 3, and 4. Although the embodiments described are variations of the preferred embodiment, the limitations of any physical embodiment should not be read as limiting the overall disclosure or scope of the invention.

Now adding FIG. 2 to the consideration, a specific physical embodiment of the process and function of the disclosed invention, can be easily understood. Game Card 20 shows a Your Innings Row 22 which corresponds to a first player's scoring and a Sponsor Row 24 which corresponds to a second player's scoring. Each row designates four randomly selected half-Innings for a baseball game. For purposes of demonstration, Game Card 20 is configured to correspond to a hypothetical "All Star Game," which is played between a team representing a National League (NL) and a team representing an American League (AL.) The first player has been assigned the following four half-Innings: National League $3^{rd}$ inning (NL3), American League $2^{nd}$ inning (AL2), National League $7^{th}$ inning (NL7), and American League $8^{th}$ inning (AL8). The second player has been assigned the following four half-Innings: American League $4^{th}$ inning (AL4), National League $4^{th}$ inning (NL4), National League $8^{th}$ inning (NL8), and American League $6^{th}$ inning (AL6).

In this embodiment, each of the run boxes in First Player Half-Inning Designator Spaces 22a, 22b, 22c, and 22d will be filled in with the number of runs scored by the designated team in the designated half-Inning, and the total number of runs will be added up and entered into First Player Total Runs Space 22e. The number entered into First Player Total Runs Space 22e will be the first player's score. Similarly, each of the run boxes in Second Player Half-Inning Designator Spaces 24a, 24b, 24c, and 24d will be filled in with the number of runs scored by the designated team in the designated half-Inning, and the total number of runs will be added up and entered into Second Player Total Runs Space 24e. The number entered into Second Player Total Runs Space 24e will be the second player's score.

To play the game, the runs are entered and totaled as described above. If one player's score is higher than the others', that player wins whatever prize is specified in the text of Game Card 20. It is optional to have a unique identifier encoded on the card (which may or may not be covered by an opaque material which must be removed by the player) that can be entered into a website and used to play electronically. Each Game Card 20 can have a unique identifier encoded on the card and the configuration of that Game Card can be stored in a computer operably communicating with the website, such that when the unique identifier is loaded into the website, the computer can provide the configuration of that Game Card and the player can play electronically as the baseball game is played. Rules 23 provide an example of how such a system would be communicated to the player.

Also shown are references to a Sponsor, which would allow the card to be used as an instant-win game by a Sponsor for promotional purposes.

Figure 3:
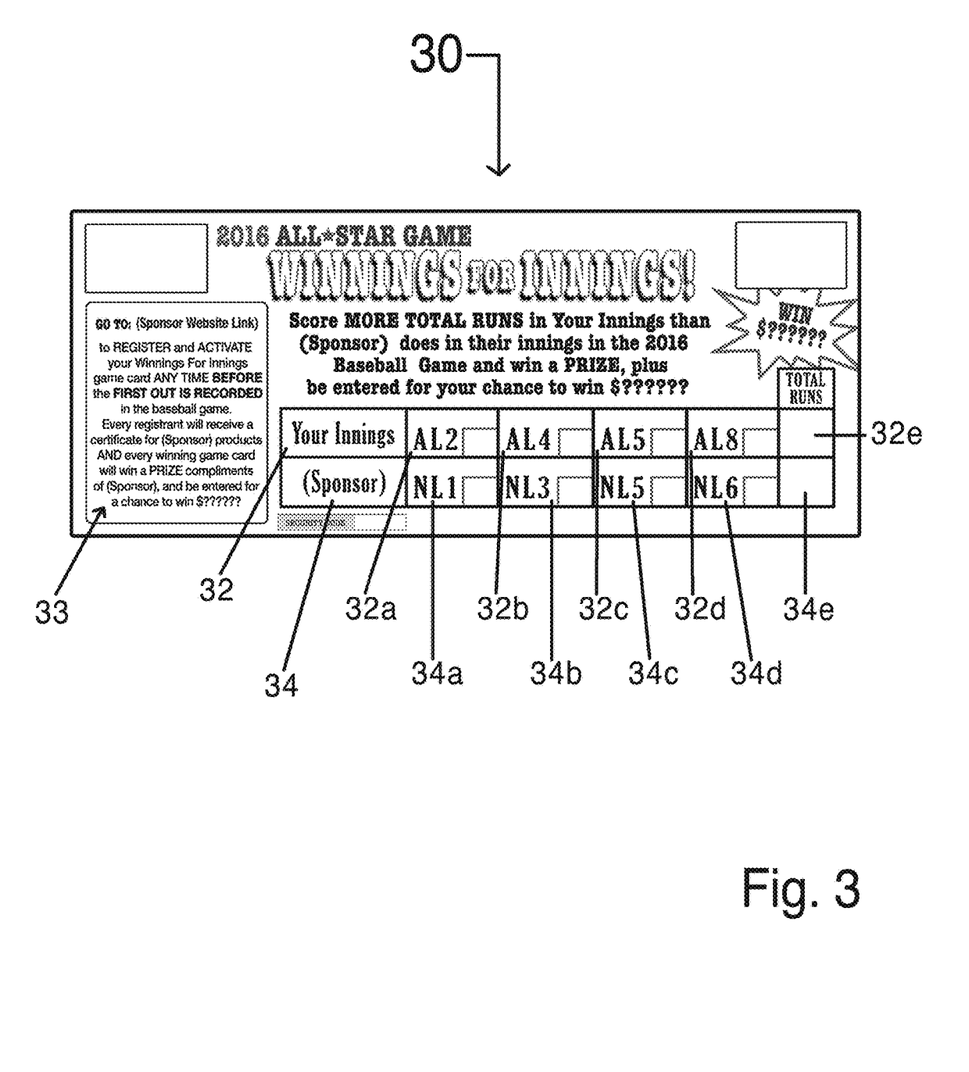
FIG. 3 depicts an overhead view of a game card comprising a first alternate embodiment of the invention.

In FIG. 3, a first alternate physical embodiment is described. Game Card 30 is configured in much the same way as Game Card 20 in FIG. 2 (not shown) but the randomly selected half-innings for each player all correspond to the same team for that player. This allows Game Card 30 to make the Player feel more invested in the outcome of the game for any particular team, and can allow cards in which the Player is located in a particular team's home city to be distributed for promotional purposes.

Figure 4:
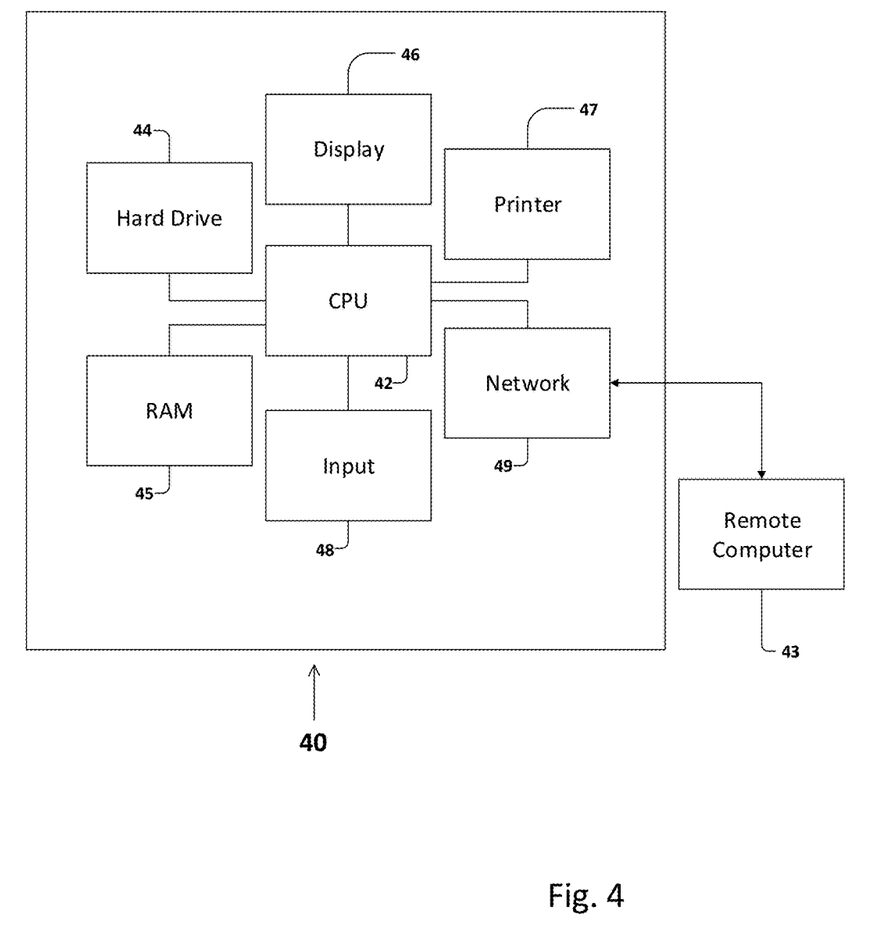
FIG. 4 depicts an abstract schematic of a physical embodiment of the invention comprising an electronic computer.

FIG. 4 shows an embodiment of the invention incorporated into an electronic computer. Although what is described is a general-purpose electronic computer, any computer or electronic device, special purpose or general purpose, such as a tablet or smartphone, can be used so long as it has equivalent functionality and/or equivalent parts with equivalent capabilities.

Computer 40 comprises CPU 42, RAM 45, Hard Drive 44, Display 46, Printer 47, Input Device 48, and Network Interface 49. A series of instructions is stored on Hard Drive 44 which encode the method of FIG. 1 and/or electronic equivalents of the Game Cards shown in FIG. 2 and FIG. 3. CPU 42 causes the instructions to be read into RAM 45 and then executes them, accepting input from the user regarding the identity of the Player and/or the verification of a Game Card through Input Device 48 and displaying the results on Display 46. The Player may optionally cause Computer 40, either directly or through input which is processed by the instructions stored on Hard Drive 44, to obtain scoring information, verification information, prize information, or other relevant data from Remote Computer 43 through Network Interface 49.

The following improvements, while not illustrated, may also be added to the preferred embodiment to enhance the utility of the invention as practiced:

1) All of the Game Cards used to embody the invention can have an identifier/security feature printed on the game card to be able to monitor the validity of the card such as many existing game cards, promotional games/drawings, games of chance, lottery cards, etc. have security/check features printed on the card's front side and/or back side.
2) Physical Game Cards with the preprinted half-Inning(s) assigned to the two players may either be printed with or without a coating (scratch-off coating) to conceal the half-Inning(s) that are assigned to each player, Player A (Your Innings) and Player B (Opponent); the need for a scratch-off coating will depend on the use of the game and/or how it is to be distributed. For example, if the Game Cards are utilized for a state and/or national lottery game, then the half-Inning(s) for each player on the card and the validation code would need to be concealed with a scratch-off coating to prevent Players from trying to get more favorable Game Cards and/or entering validation codes from Game Cards they have not purchased, but merely examined.
3) The Game Cards can be utilized for a local or national free/promotional game and/or a lottery scratch-off card. An example of a free/promotional game card can be a freely distributed Game Card corresponding to the Major League Baseball® All-Star Game®, which is of national interest in the United States and can be used to promote a large variety of Sponsor or Advertiser interests and activities.
4) A sports team or organization, acting as Sponsor and/or Advertiser, can invite the public to visit a website during the actual television broadcast of an Event, or via an email, text, tweet or other electronic notification of the Event prior to the Event's commencement of play to register and receive a randomly generated Game Card through the global computer network, via smartphone app, or by any other reasonable means.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this apparatus and method can become clear to a person having ordinary skill in this particular art. Such modifications are clearly covered by this disclosure.

The invention claimed is:

1. A method for playing a sports-related card fill game comprising:
   a) selecting a sporting event;
   b) defining at least four unique scoring periods associated with the sporting event;
   c) assigning a first subset of the unique scoring periods to a first player by printing them on a game card, the game card having a plurality of first player scoring blanks, the first subset being equal to half of the at least four unique scoring periods;
   d) assigning a second subset of the unique scoring periods to a second player by printing them on the game card, the game card having a plurality of second player scoring blanks, the second subset being equal to the unique scoring periods which are not contained in the first subset;
   e) evaluating a plurality of first player period scores, each first player period score for each of the unique scoring periods based on a plurality of scoring events which occur during the unique scoring period in the sporting event, each first player period score corresponding to one of the plurality of first player scoring blanks;
   f) assigning a first final score to the first player, the first final score comprising a sum of the plurality of the first player period scores, the first final score corresponding to a first player final scoring blank on the game card;
   g) evaluating a plurality of second player period scores, each second player period score for each of the unique scoring periods based on a plurality of scoring events which occur during the unique scoring period in the sporting event, each second player period score corresponding to one of the plurality of second player scoring blanks; and,
   h) assigning a second final score to the second player, the second final score comprising a sum of the plurality of the second player period scores, the second final score corresponding to a second player final scoring blank on the game card, the second final score and the first final score together comprising a set of final scores.

2. A method for playing a sports-related card fill game as in claim 1, further comprising the steps of:
   a) evaluating the first final score and the second final score to determine if the first final score and the second final score both have a zero value, and if so declaring the sports-related card fill game to be drawn and ending the sports-related card fill game, otherwise proceeding to the next step; and,
   b) determining if the set of final scores has a larger member and if so, declaring a winner of the sports-related card fill game corresponding to either the first player or the second player, whichever corresponds to the larger member of the set of final scores, and ending the sports-related card fill game.

3. A method for playing a sports-related card-fill game as in claim 2, further comprising the steps of:
   a) determining that the set of final scores does not have a larger member and if so, continuing to the next step; and,
   b) determining if any of the plurality of first player period scores is larger than all of the plurality of second player period scores, or vice versa, and if so declaring a winner of the sports-related card fill game corresponding to either the first player or the second player, whichever corresponds to the plurality of first player period scores or the plurality of second player period scores which contains a largest member, otherwise continuing to the next step.

4. A method of playing a sports-related card fill game as in claim 3, further comprising the steps of:
   a) determining that the set of final scores does not have a larger member, and if so continuing to the next step;
   b) determining that none of the plurality of first scores is larger than any of the plurality of second scores and that none of the plurality of second scores is larger than any of the plurality of first scores, and if so continuing to the next step; and,
   c) determining which of the plurality of first player period scores and the plurality of second player period scores occurred first chronologically, that being the first chronological score, and declaring a winner of the sports-related card fill game corresponding to the first player or the second player, whichever corresponds to the first chronological score.

5. A sports-related card fill game comprising:
   a) a game card, the game card being associated with a sporting event by having a marking corresponding to the sporting event;
   b) a plurality of first player score blanks, each first player score blank corresponding to a unique first player scoring period assigned to a first player and corresponding to one of a plurality of unique sporting event score periods in the sporting event;
   c) a plurality of second player score blanks, each second player score blank corresponding to a unique second player scoring period assigned to a second player and corresponding to one of the plurality of unique sporting event score periods in the sporting event which are not assigned to the first player;
   d) a first player total score blank corresponding to a sum of a plurality of first player score values, the plurality of first player score values being stored in the plurality of first player score blanks, each of the plurality of first player score values being associated with a plurality of scoring events in a corresponding member of the plurality of unique sporting event score periods which are assigned to the first player, and;
   e) a second player total score blank corresponding to a sum of a plurality of second player score values, the plurality of second player score values being stored in the plurality of second player score blanks, each of the plurality of second player score values being associated with a second plurality of scoring events in a corresponding member of the plurality of unique sporting event score periods which are assigned to the second player.

6. A sports-related card fill game as in claim 5, further comprising:
   a) a unique identifier printed on the game card, which enables the game card to be authenticated by a game play supervising entity.

7. A sports-related card fill game as in claim 6, wherein the unique identifier is covered by an opaque tamper-evident coating.

8. A sports-related card fill game as in claim 5, further comprising:
   a) a first plurality of opaque tamper-resistant coatings covering a plurality of portions of the plurality of first score blanks such that until the opaque tamper-resistant coating covering one of the portions of the first score blank is removed, which unique sporting event score period is associated with the first score blank cannot be determined; and,
   b) a second plurality of additional opaque tamper-resistant coatings covering a plurality of portions of the plurality of second score blanks such that until the additional opaque tamper-resistant coating covering one of the portions of the second score blank is removed, which unique sporting event score period is associated with the second score blank cannot be determined.

9. A sports-related card fill game as in claim 8, further comprising:
   a) a unique identifier printed on the game card, which enables the game card to be authenticated by a game play supervising entity.

10. A device for playing an electronic sports-related card fill game comprising:
    a) a digital computer comprising a CPU, a RAM and/or a persistent storage device, an input device, and a visual display, the RAM and/or the persistent storage device, the input device, and the visual display operably connected to the CPU;
    b) a set of instructions stored on the RAM and/or the persistent storage device which are executed by the CPU and cause the digital computer to perform the following operations;
       i. select a sporting event;
       ii. define at least four unique scoring periods associated with the sporting event;
       iii. assign a first subset of the unique scoring periods to a first player, the first subset being equal to half of the at least four unique scoring periods;
       iv. assign a second subset of the unique scoring periods to a second player, the second subset being equal to the unique scoring periods which are not contained in the first subset;
       v. evaluate a plurality of first player period scores, each first player period score for each of the unique scoring periods based on a plurality of scoring events which occur during the unique scoring period in the sporting event;
       vi. assign a first final score to the first player, the first final score comprising a sum of the plurality of the first player period scores;
       vii. evaluate a plurality of second player period scores, each second player period score for each of the unique scoring periods based on a plurality of scoring events which occur during the unique scoring period in the sporting event;
       viii. assign a second final score to the second player, the second final score comprising a sum of the plurality of the second player period scores, the second final score and the first final score together comprising a set of final scores;

ix. evaluate the first final score and the second final score to determine if the first final score and the second final score both have a zero value, and if so declare the electronic sports-related card fill game to be drawn, display a drawn game message on the visual display, and end the electronic sports-related card fill game, or otherwise continue to the next step;

x. determine if the set of final scores has a larger member and if so, identify a winner of the electronic sports-related card fill game corresponding to either the first player or the second player, whichever corresponds to the larger member of the set of final scores, display the identity of the winner on the visual display, and end the electronic sports-related card fill game.

11. A device for playing an electronic sports-related card fill game as in claim 10, further comprising:

a) a set of additional instructions stored on the RAM and/or the persistent storage device, which are executed by the CPU if the first final score and the second final score have the same value which is greater than zero, and cause the digital computer to perform the following actions:

i. determine if any of the plurality of first player period scores is larger than all of the plurality of second player period scores, or vice versa, and if so identify a winner of the electronic sports-related card fill game corresponding to either the first player or the second player, whichever corresponds to the plurality of first player period scores or the plurality of second player period scores which contains a largest member, display the identity of the winner of the electronic sports-related card fill game on the visual display, and end the electronic sports-related card fill game.

12. A device for playing an electronic sports-related card fill game as in claim 10, further comprising:

a) a set of additional instructions stored on the RAM and/or the persistent storage device, which are executed by the CPU if the first final score and the second final score have the same value which is greater than zero, and cause the digital computer to perform the following actions:

i. determine which of the plurality of first player period scores and the plurality of second player period scores occurred first chronologically, that being the first chronological score, and identify a winner of the sports-related card fill game corresponding to the first player or the second player, whichever corresponds to the first chronological score.

13. A device for playing an electronic sports-related card fill game as in claim 11, further comprising:

a) a set of additional instructions stored on the RAM and/or the persistent storage device, which are executed by the CPU if both: the first final score and the second final score have the same value which is greater than zero; and none of the plurality of first player period scores is larger than any of the plurality of second player period scores or vice versa; the set of additional instructions causing the digital computer to perform the following actions:

i. determine which of the plurality of first player period scores and the plurality of second player period scores occurred first chronologically, that being the first chronological score, and identify a winner of the sports-related card fill game corresponding to the first player or the second player, whichever corresponds to the first chronological score.

14. A device for playing an electronic sports-related card fill game as in claim 10, further comprising:

a) a set of additional instructions stored on the RAM and/or the persistent storage device, which are executed by the CPU, the set of additional instructions causing the digital computer to perform the following actions:

i. display a virtual game card on the visual display, the virtual game card including a sporting event display area wherein the sporting event is identified, the virtual game card further including a plurality of first scoring period display areas where the first subset of the unique scoring periods are displayed, the virtual game card further including a plurality of second scoring period display areas where the second subset of the unique scoring periods are displayed, the virtual game card further including a first final score display area where the first final score is displayed, and the virtual game card further including a second final score display area where the second final score is displayed.

* * * * *